United States Patent [19]
Von Duyke

[11] 3,727,501
[45] Apr. 17, 1973

[54] POTATO DICING MACHINE
[76] Inventor: Harrison M. Von Duyke, 709 Shipley Street, 2nd Floor, Wilmington, Del. 19801
[22] Filed: Sept. 27, 1971
[21] Appl. No.: 183,878

[52] U.S. Cl..................83/438, 99/485, B26d/3/20
[58] Field of Search.....................146/78 A

[56] References Cited

UNITED STATES PATENTS

| 1,251,885 | 1/1918 | Hanusch | 146/78 A |
| 1,417,360 | 5/1922 | Trynoski | 146/78 A |
| 2,388,725 | 11/1945 | Criner | 146/78 A |

Primary Examiner—Willie G. Abercrombie
Attorney—Zachary T. Wobensmith, 2nd

[57] ABSTRACT

Apparatus for dicing cooked potatoes which includes a base, support members for supporting the potatoes, longitudinally extending rods on the base carrying a pair of opposed cutting frames, which frames have metallic cutting wires thereon, and a rotary drive connecting the frames to provide horizontal motion to the frames to cut the potatoes into strips and providing timed motion to vertically movable blades carried by the frames to further dice the potatoes which can then be moved off the base and which apparatus includes an automatic potato feed also connected to the drive to place potatoes in position on the base between the frames for dicing.

10 Claims, 5 Drawing Figures

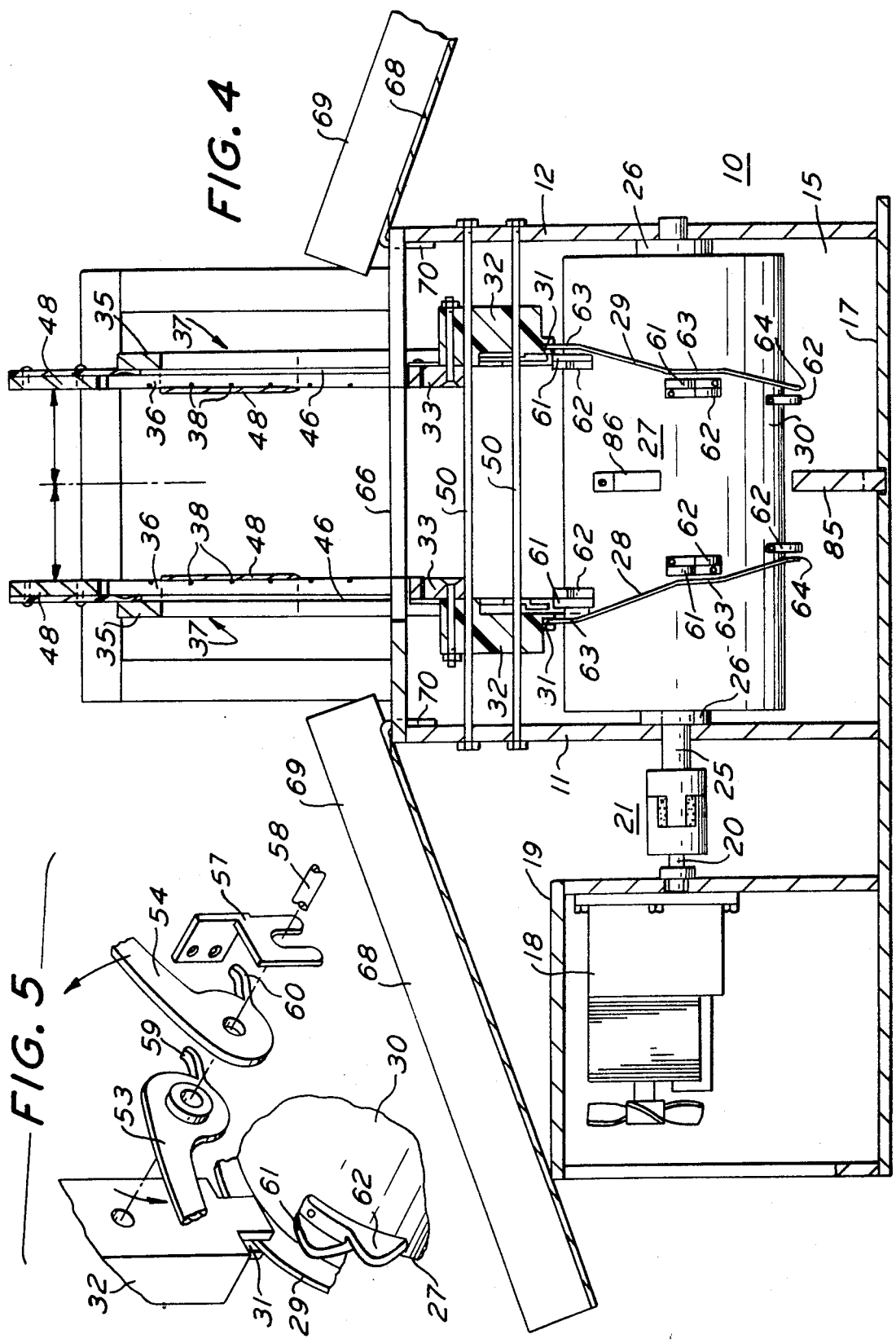

POTATO DICING MACHINE

BACKGROUND OF THE INVENTION

1. Field of the Invention

This machine relates to a machine for dicing cooked potatoes which includes filamentary cutters and blades movable transversely thereto.

2. Description of the Prior Art

Many machines have been devised for dicing cooked potatoes for use in salads and other food combinations.

One such machine is shown in my prior U.S. Pat. No. 3,578,048 which has proven quite satisfactory, however, the machine is manually operated and does not provide the volume of diced potatoes required by commercial users.

The cooked potatoes are very soft and easily damaged by most of the previously available equipment. The potato dicing machine of the invention does not damage the potatoes and turns out a large volume of diced potatoes in a short time of uniform quality and at low cost.

SUMMARY OF THE INVENTION

A machine for dicing cooked potatoes is provided which retains the potatoes on support members fastened to a base which has longitudinally extending rods thereon carrying a pair of cutting frames which are movable towards and away from each other to cut the potatoes into strips, the frames each being provided with a vertically movable blade for cutting the potato strips into cubes with delivery of the cut cubes and a rotary drive connecting the frames providing synchronized horizontal frame and vertical blade movement to cube the potatoes with an automatic potato feed to place potatoes on the support members for cutting.

The principal object of the invention is to provide a machine for quickly dicing cooked potatoes which produces diced potatoes of uniform size and quality.

A further object of the invention is to provide a machine for dicing cooked potatoes which dices the potatoes automatically.

A further object of the invention is to provide a machine for dicing cooked potatoes that has an automatic potato feed and delivery of the diced pieces.

A further object of the invention is to provide a machine for dicing cooked potatoes that is simple and inexpensive to construct but sturdy and reliable in operation.

A further object of the invention is to provide a machine for dicing cooked potatoes that is easy to operate and to clean.

A further object of the invention is to provide a machine for dicing cooked potatoes that presents an attractive appearance.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 4 is a vertical sectional view, taken approximately on the line 4—4 of FIG. 3; and FIG. 5 is a fragmentary exploded perspective view, showing a portion of the internal operating mechanism of the apparatus.

Figure 1:
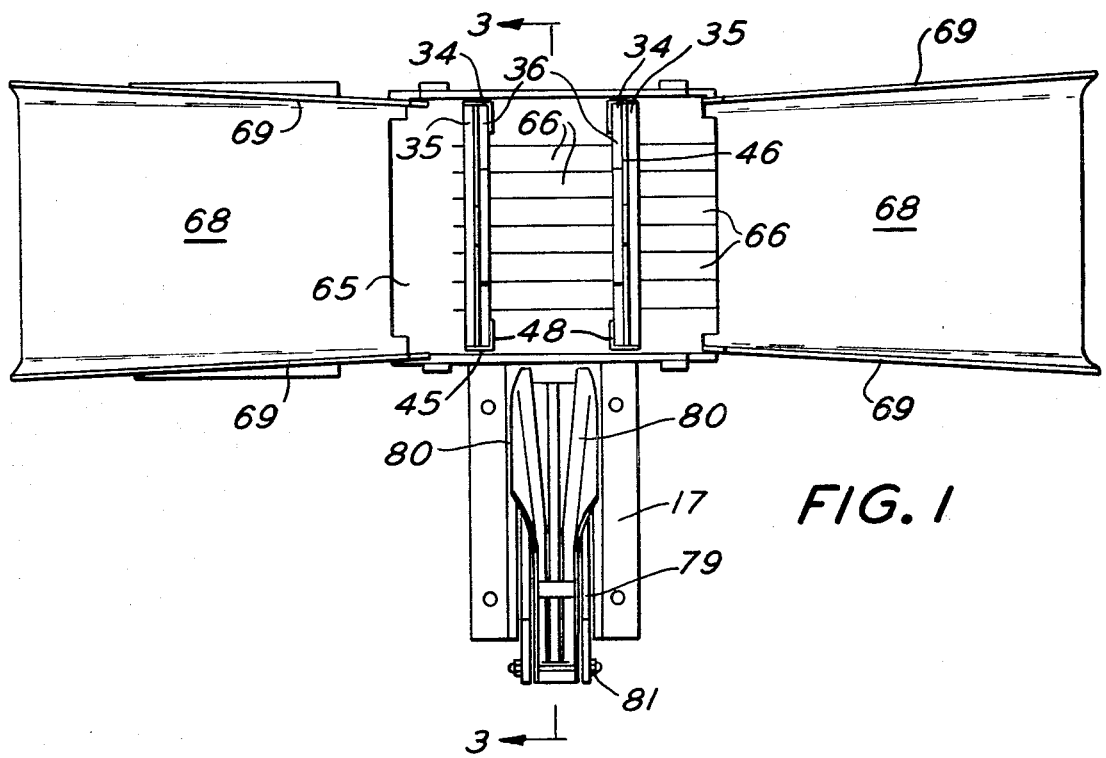
FIG. 1 is a plan view of the potato dicing machine of the invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings, the potato dicing machine of the invention includes a base assembly 10 which has vertical front and rear panels 11 and 12 and vertical side panels 14 and 15. The panels 11, 12, 14 and 15 are joined together at their ends in a rectangular configuration which is open at the top and bottom.

The panels 11, 12, 14 and 15 are retained on a base plate 17 to which they may be secured in any desired manner such as in grooves (not shown) and preferably with easy detachment from the plate 17 for access for cleaning.

A driving motor 18 is provided mounted to and enclosed by a cover 19 which is also detachably secured to plate 17. The motor 18 has an output shaft 20 and a coupling 21, engaged with the shaft 20, and with a shaft 25 which is carried in bearings 26 secured to panels 11 and 12. The shaft 25 has a drum 27 secured thereon of generally cylindrical shape with a pair of cam tracks 28 and 29 extending in a predetermined converging and diverging pattern around the outside surface 30 of drum 27. The tracks 28 and 29 have grooves 31 of frame carrier blocks 32 normally engaged therewith.

The blocks 32 are each secured to a baseplate 33 on each of a pair of opposed cutting frames 34. The frames 34 each has a pair of vertical panels 35 and 36 secured thereto each of which panels 35 and 36 has a central cutout portion 37. A series of filamentary cutting members 38 are strung across cutout 37 of one of the panels 35 and fastened in holes 39 which filamentary members are shown as being of fine stainless steel wire. Any lightweight material of suitable strength may be used as desired. The filamentary members 38 are also strung through holes 40 in baseplate 33 providing both vertical and horizontal cutting members. The frames 34 are mounted in spaced relation to provide a space 46 therebetween. The spaces 46 each has a U-shaped blade carrier frame 47 slidably carried therein and capable of vertical movement and carrying a blade 48 on the inner sides of the frames 34.

The frame carrier blocks 32 are slidably carried on rods 50 engaged in the front and rear plates 11 and 12.

The blade carrier frames 47 each has a lower extension 51 with a pin 52 secured therein carrying links 53 and 54 on a shaft 58 secured in blocks 32 and have pawls 59 and 60 attached thereto.

The link 53 with pawl 59 is utilized to provide an impetus to the blades 48 and cause them to move downwardly along frames 34 for cutting the potatoes. The link 54 with pawl 60 is utilized to lift the blades 48 and cause them to be returned to their normal out of potato engagement position.

The pawls 59 and 60 are actuated to cause the link 53 and 54 movement by a series of spaced cams 61 and 62 which are located on the outer surface 30 of the drum 27 at predetermined intervals.

Each of the cam tracks 28 and 29, at the cams 61 and 62, has a dwell 63 to permit of reciprocation of the cutter blades 48 while the carrier blades 32 engaged at the dwell portions 63 hold the frames 34 in a stationary position. The cam tracks 28 and 29 have return portions 64. A pair of cutting boards 65 are provided of U-shape in cross section with one for each frame 34 and engaged with the frames 34.

The boards 65 rest on a series of flat supports 66 which pass between the cutting members 38 and the supports 66 are fastened at their ends to plates 11 and 12 and provide support for the potatoes to be diced.

Chutes 68 are provided for receiving the diced potatoes from the supports 66 for use and include upturned side flanges 69 and hooks 70 engaged with the supports 66 and the plates 11 and 12.

Figure 2:
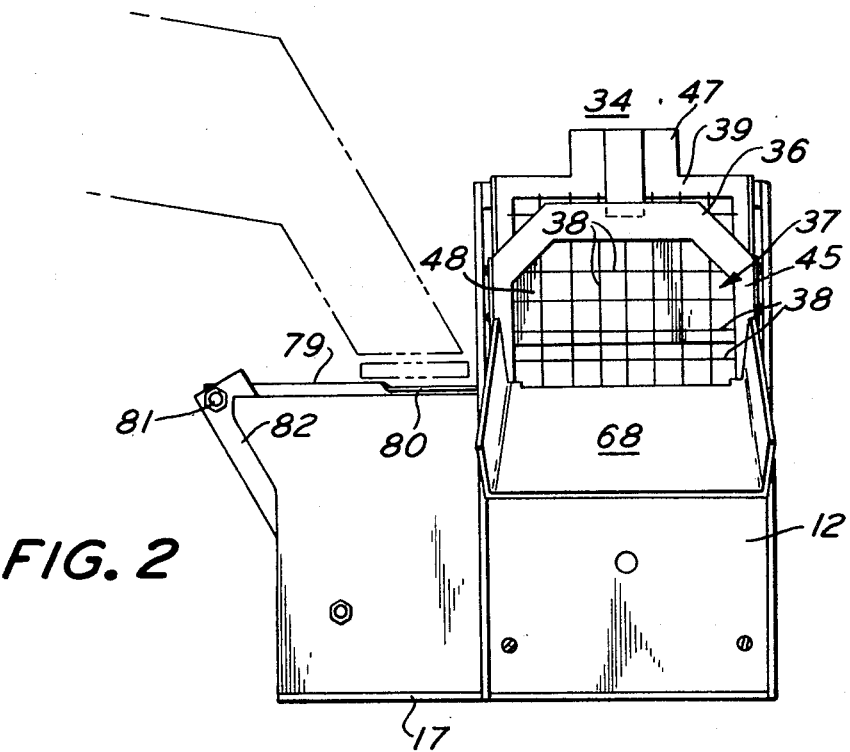
FIG. 2 is a side elevational view of the apparatus of FIG. 1.
Figure 3:
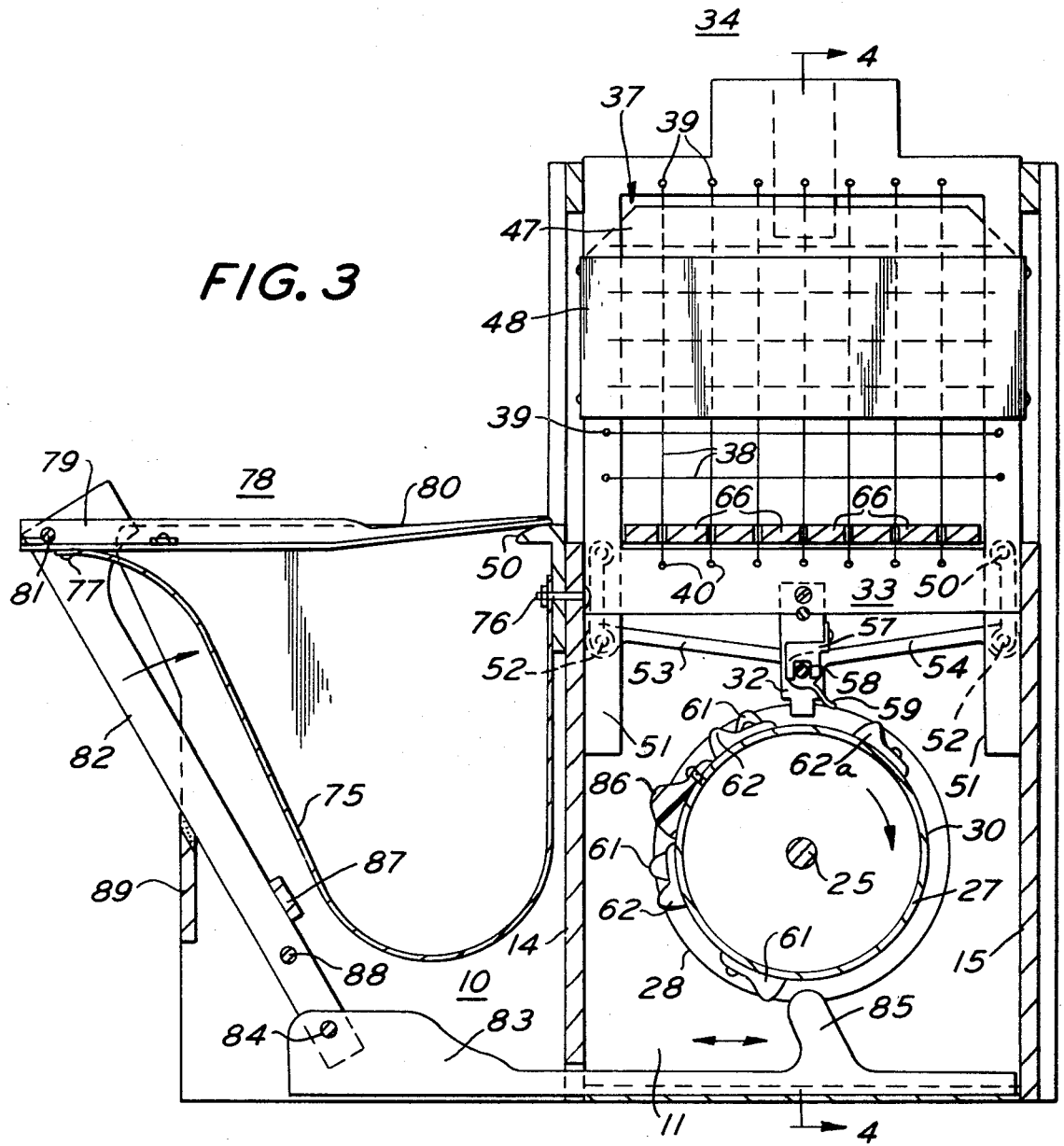
FIG. 3 is a vertical sectional view, enlarged, taken approximately on the line 3-3 of FIG. 1.

The automatic potato feed for delivery of a cooked potato for dicing is shown at the left in FIGS. 1, 2 and 3, which feed includes a return spring 75 secured to plate 14 by a screw 76. A scoop 78 is provided to which spring 75 is connected by screw 77 and which includes an arm 79 with fingers 80 for supporting a cooked potato to be placed on supports 66 for dicing. The arm 79 has a pivot pin 81 carried thereby and has spaced levers 82 which are pivotally connected by pivot pin 84 to an arm 83 and has a pawl 85. The arms 82 are connected by a bar 87, are fulcrumed on a shaft 88 and are limited in their movement in one direction by a limit stop bar 89. The drum 27 has a cam 86 thereon which is a single cam and engages the pawl 85 during each single rotation of the drum 27 to cause the arm 83, arm 79 and fingers 80 to actuate the scoop 78 to advance a potato to supports 66 for dicing.

The mode of operation will now be pointed out.

A cooked potato that is to be diced is placed on scoop 78 and motor 18 is activated. Assuming no potatoes are on supports 66 and that frames 34 are separated to the maximum extent, the drum 27 is rotated by the motor 18 acting through shaft 20, coupling 21 and shaft 25. The cam 86 engages the pawl 85 and causes the arm 83 to be pushed to the left as shown in FIG. 3 which causes levers 82 to move scoop 78 and a potato thereon (not shown) onto the supports 66 between the frames 34 where the potato is then supported and the fingers 80 are withdrawn. The further rotation of drum 77 causes the blocks 32 engaged with the cam tracks 28 and 29 to converge towards one another until contact with the potato is made. The potato is contacted by the filamentary cutting members 38 and cut into strips as frames 34 continue their converging movement. At intervals as dictated by the positions of cams 61 on the drum 27, and at the dwells 63, the cutter blades 48 are caused to move downwardly by the engagement of the pawls 59 with the cam 61 and through link 53 and extension 51 thereby cutting the potato strips into cubes. The blades 48 are moved upwardly immediately after the downward cutting movement and during a dwell at 63 by engagement of pawl 60 with the cam 62.

The dicing continues until the frames are at their closest position in the center where the blades 48 are left in their downward positions and frames 34 are moved apart by the return portions 64, causing the diced potatoes to be moved onto the chutes 68 and delivered for use. When the frames 34 are moved to the extreme outer position the pawls 60 are engaged by cams 62a and the blades 48 are pushed upwardly.

The blades 48 are normally held in their uppermost postions by frictional engagement of the blade carrier frames 47 with the frames 34 at the top.

A potato is placed on scoop 78 and the cycle continues as before.

It will thus be seen that apparatus has been provided with which the objects of the invention are attained.

I claim:

1. A potato dicing machine which comprises a pair of parallel frames, a base on which said frames are mounted, means for moving said frames in parallel relation toward and away from each other, each of said frames having a plurality of filamentary cutting members for cutting a potato disposed therebetween into strips, cutter blades carried by each of said frames and movable transversely to the plane of said frames for cutting said potato strips into cubes, and driving means for moving said blades in predetermined timed relation.

2. A potato dicing machine as defined in claim 1 in which said means for moving said frames comprises cam means and members engaging said cam means and connected to said frames in actuating relation thereto.

3. A potato dicing machine as defined in claim 1 in which said driving means comprises cam members and pawls engageable therewith.

4. A potato dicing machine as defined in claim 1 in which said means for moving said frames comprises a drum with cam means thereon, and members engaging said cam means and connected to said frames in actuating relation thereto, and said driving means comprises cam members on said drum and pawls engageable therewith.

5. A potato dicing machine as defined in claim 2 in which said cam means comprises spaced cam tracks.

6. A potato dicing machine as defined in claim 5 in which said cam tracks have converging and diverging portions and interposed dwell portions.

7. A potato dicing machine as defined in claim 1 in which said frames are vertically disposed and mounted for horizontal movement, and said cutter blades are mounted for vertical movement.

8. A potato dicing machine as defined in claim 1 in which said driving means includes members for positively impelling said blades upwardly and downwardly.

9. A potato dicing machine as defined in claim 8 in which members are provided frictionally holding said blades in their uppermost positions.

10. A potato dicing machine as defined in claim 1 in which means is provided for advancing a potato between said frams in a separated condition of said frames.

* * * * *